UNITED STATES PATENT OFFICE.

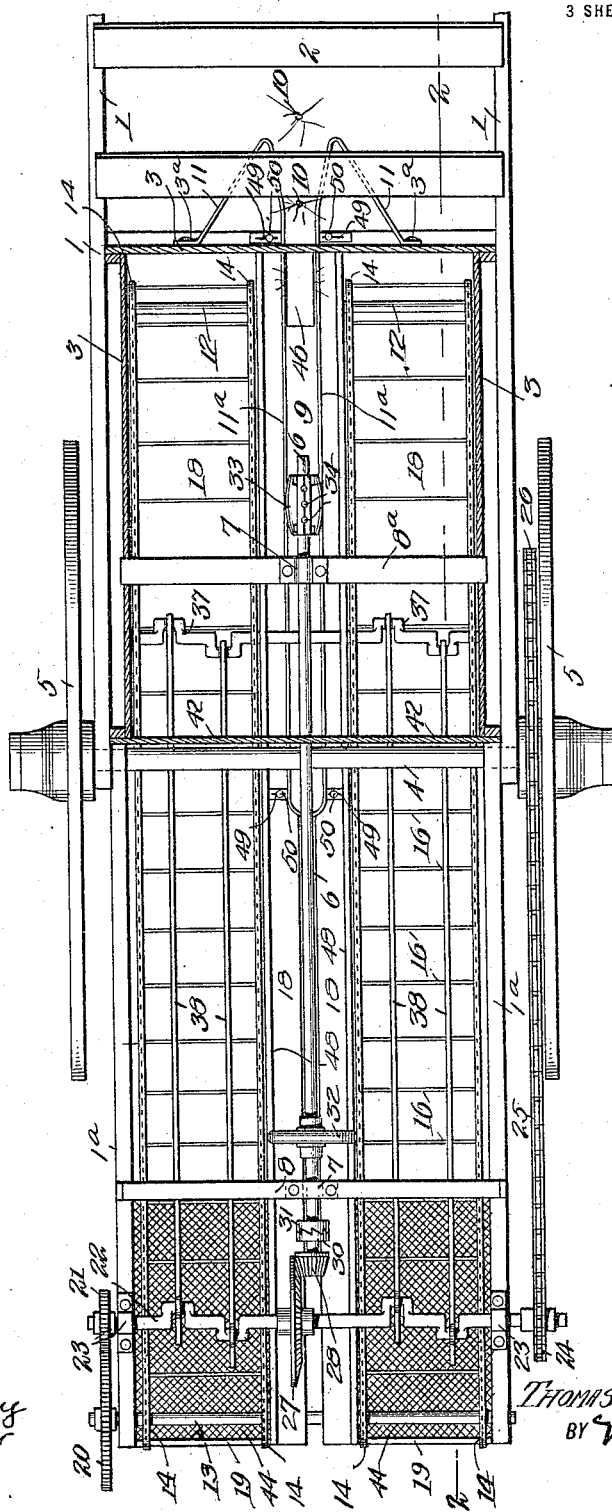

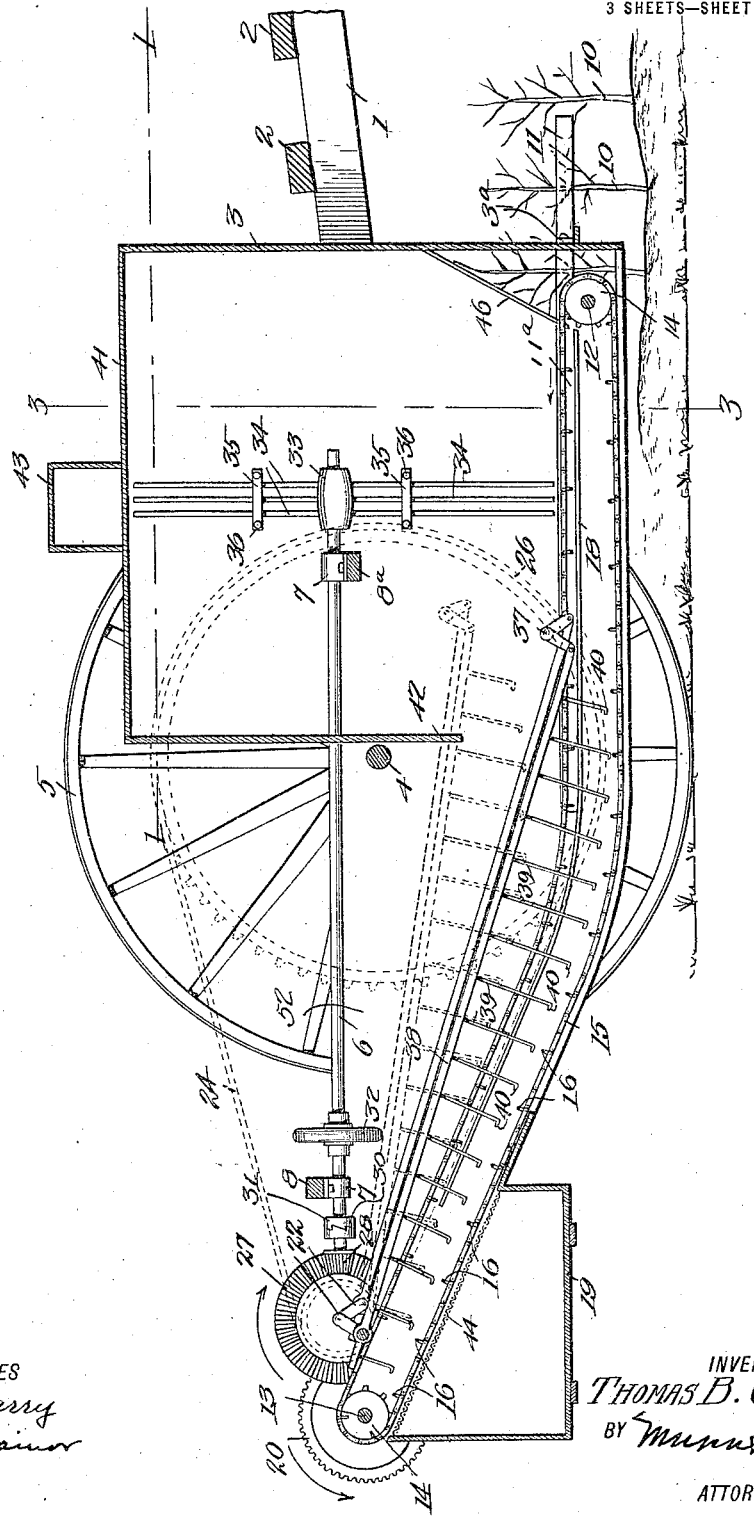

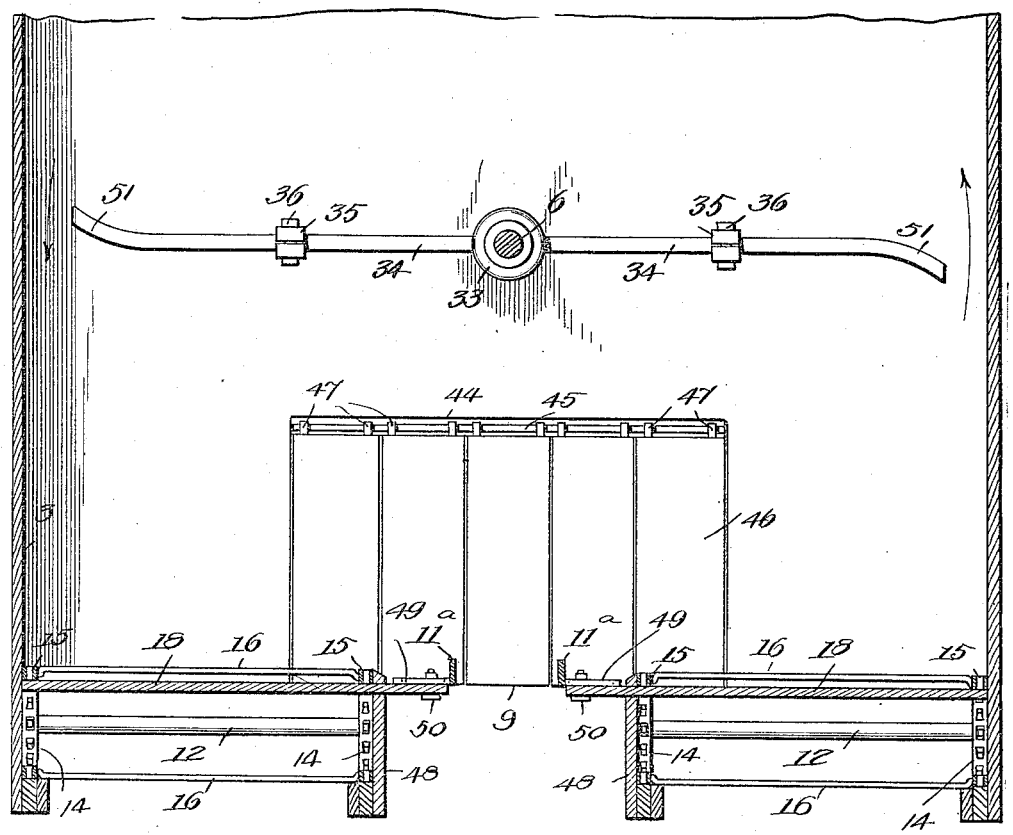

THOMAS B. GRAY, OF NORFOLK, VIRGINIA.

PEA-HARVESTER.

1,184,524.  Specification of Letters Patent.  Patented May 23, 1916.

Application filed May 23, 1911, Serial No. 628,953. Renewed November 13, 1915. Serial No. 61,447.

*To all whom it may concern:*

Be it known that I, THOMAS B. GRAY, a citizen of the United States, and a resident of Norfolk, county of Norfolk, and State of Virginia, have invented certain new and useful Improvements in Pea-Harvesters, of which the following is a specification.

My invention is an improvement in pea harvesters, and has for its object to provide a simple, easily operated machine of the character specified, especially adapted to remove the pods and the peas from the plants in the field without disturbing the vines, and to provide a mechanism for cleaning the peas and for separating them from the broken leaves, pods and the like, and for finally discharging them in condition for the market.

In the drawings, Figure 1 is a section on the line 1—1 of Fig. 2, Fig. 2 is a section on the line 2—2 of Fig. 1, and, Fig. 3 is a section on the line 3—3 of Fig. 2.

The present embodiment of the invention comprises a suitable frame, composed of approximately parallel laterally spaced sectional side or cheek plates, each of the said side or cheek plates consisting of front and rear sections 1 and 1$^a$, lapping at their meeting ends, and secured together in any suitable manner, and an axle 4 is journaled in the lapping ends of the sections, the said axle being arranged transversely of the frame at approximately the center thereof.

The front sections 1 of the cheek plates are connected at their front ends by cross bars 2, and a box or receptacle 3 is supported between the said sections, the said box extending from the axle to near the rear cross bar 2. The rear section 1$^a$ of the cheek plates have their lapping ends on the inner sides of the front sections, and the rear end of the box or receptacle 3 fits between the cheek plates, and extends above and below the said cheek plates, as shown in Fig. 2. Wheels 5 are journaled on the ends of the axle, the said wheels supporting the frame for movement through the field.

A shaft 6 is journaled longitudinally of the frame at the center thereof, in bearings 7, on cross bars 8 and 8$^a$ arranged transversely of the frame. The rear cross bar 8 connects the rear sections 1$^a$ of the cheek plates, and the front cross bar 8$^a$ is arranged between the sides of the box 3, the ends of the cross bar extending through the side walls of the said box. The bottom of the box is longitudinally slotted or recessed, to form a passage 9 extending from the front to the rear of the box, for permitting the passage of the plants 10.

Guide brackets are arranged in front of the box, on each side of the said passage, each of the said brackets being formed of strap material, having one of its ends secured to the front of the box on the adjacent side of the passage 9, as indicated at 3$^a$. From the said connection each bracket extends forwardly and inwardly, as indicated at 11, and is then bent backward, and extends through the passage 9 to the rear of the box, as indicated at 11$^a$. The portions 11$^a$ of the brackets are supported on each side of the passage, by means of lugs 49 extending angularly from the brackets, the said lugs being slotted longitudinally, and the slots are engaged by bolts 50 passing upwardly through floors or aprons 18 and through the slots of the lugs.

The floors or aprons 18 are arranged on each side of the passage 9, the said floors or aprons forming the bottom of the box 3, and the passage 9 may be widened or narrowed by loosening the bolts, and moving the portions 11$^a$ of the brackets inwardly or outwardly. The portions 11$^a$ of the brackets diverge slightly in front of the box 3, and the plants 10 enter the passage 9 between the diverging ends of the said portions.

A pair of alined shafts 12 is journaled transversely of the box at the front corners thereof, and a shaft 13 is journaled transversely of the rear ends of the rear sections of the cheek plates. A pair of sprocket wheels 14 is secured to each shaft 12 in spaced relation, and other pairs of sprocket wheels 14 are secured to the shaft 13, each pair on the shaft 13 being on one side of the passage 9 and in alinement with the pair on the adjacent shaft 12. An endless chain 15 is supported on each registering pair of wheels, and the two chains on each side of the passage 9 are connected by spaced slats 16. Each pair of chains and their connecting slats forms an endless conveyer, and it will be evident from the description that one of the said conveyers is arranged on each side of the passage 9.

A floor or apron 18 before mentioned is arranged below the upper run of each conveyer, and each floor or apron extends from the shaft 12, to a connection with the front edge of a box 19 arranged transversely of the frame at each side thereof at the rear of the cheek plates and below the shaft 13. The shaft 13 is provided at one end with a gear wheel 20, outside the frame, which meshes with a pinion 21 on a crank shaft 22, journaled transversely of the frame, near the shaft 13, in bearings 23 on the plate 1. The shaft 22 is provided at its opposite end with a sprocket wheel 24, connected by a chain 25, with a sprocket wheel 26, secured on the inner face of the adjacent wheel 5, and coaxial therewith. The shaft is also provided with a bevel gear wheel 27, near its center, which meshes with a bevel pinion 28, journaled loosely on the shaft 6, before mentioned. The hub 30 of the pinion is provided with clutch teeth for engagement by similar teeth on a sleeve 31 feathered on the shaft 6, and movable into and out of engagement with the hub, to connect the shaft 6 with the shaft 22. The front end of the shaft 6 extends forwardly to near the center of the box 3, and a hub 33 is secured to the forward end of the shaft within the box. A fly wheel 32 is secured to the shaft near the clutch, to steady the shaft and make its motion uniform. The hub is provided with a plurality of sets of parallel spaced radial arms 34. The arms of each set are arranged longitudinally of the hub, and are held in proper position, intermediate their ends, by clamping plates 35, held together by bolts 36. The arms 34 swing transversely of the plant rows, and the outer ends of the arms engage the plants, and knock the peas therefrom, onto the conveyers at each side. A crank shaft 37 is journaled transversely of the frame, below and in front of the axle, and a bar 38 connects each crank of the said shaft, with the registering crank on the shaft 22. Each bar is provided with a longitudinal series of spaced depending teeth 39, and each of the teeth is provided with a rearwardly extending lug 40 at its extremity.

The box 3 is closed at its top and sides, and the upper part of the rear thereof is also closed, an opening, however, being provided near the bottom of the box, and extending the full width of the box. The rear wall 42 of the box is cut away below the axle 4, as shown in Fig. 2. The front wall of the box, as shown in Fig. 3, is provided with an opening 44 at the passage 9, the said opening extending on each side of the passage. A shaft 45 is journaled at the upper end of the opening and transversely thereof, and a plurality of plates or fingers 46 depend from the shaft, each plate or finger having bearings 47 at its upper end engaging the shaft. The said plates or fingers swing freely on the shaft, and when the plants 10 enter the passage 9, the said plates or fingers are lifted and swung rearwardly by the plants, to permit the entrance of the plants into the passage. The said plates or fingers 46 are intended to prevent the peas being knocked out through the opening 44, the said opening being necessary to permit the entrance of the plants. The floors or aprons 18 at each side of the passage 9 are spaced apart, as shown in Fig. 3, and a plate 48 is arranged vertically at each side of the said passage, the said plates 48 being on the inner sides of the innermost chains of the conveyers.

It will be noticed from an inspection of Fig. 3, that the free end of each of the arms 34 is curved, as indicated at 51, and all of the arms are similarly arranged. A tool box 43 is mounted on the top 41 of the box 3. The receptacles 19, before mentioned, are arranged directly below the rear ends of the endless conveyers, and the said conveyers incline upwardly toward their rear ends. A screen 44 is arranged at the top of each box, each of the screens being directly below the end of the adjacent conveyer, and the lower run of each conveyer moves near the upper face of the adjacent screen.

In operation, the machine is drawn through the field, with the wheels 5 astride the row of plants, and in such position, that the plants in the row will enter the passage 9 between the guide brackets 11—11ᵃ. As the machine travels, the shaft 22 is rotated and the said shaft rotates the shaft 6, to cause the beater arms 34 to swing transversely of the plants in the row, in the direction indicated by the arrows in Fig. 3. The arms 34 strike the plants, and knock the pods and peas from the plants, and the peas fall on the floors or aprons 18. The pods are broken by the beater arms, so that the peas will be dislodged and the said peas together with the broken pods, leaves and the like, are moved rearwardly by the upper runs of the endless conveyers at each side of the passage 9. The shafts 22 and 37 are rotated continuously, to cause the bars 38 to be moved upwardly, forwardly, downwardly, and rearwardly, in a manner similar to the tedder forks of a hay tedder. The teeth 39 are thus caused to push the material rearwardly, thus assisting the action of the conveyers, in moving the material to the rear of the machine. As the plants engage the plates 46, the said plates are swung rearwardly, as indicated in Fig. 2, to permit the plants to enter, and the said plates afterward swing into vertical position, thus preventing the dislodged peas from escaping through the opening of the box. The peas, pods, leaves and the like, finally reach the screens 44 at the rear of the machine, and the said material is dropped on to the screens over the rear ends of the floors 18. The screens are of such mesh that the peas may fall into the receptacles 19, while the leaves, broken branches, pods and the like are discharged in a manner to be presently described. The beater arms 34 effectually remove all of the peas from the plants, but in addition to the peas the said arms also knock off dry pods and leaves, and withered branches, and it is necessary to separate the peas from the trash above mentioned, in order that they may be in marketable condition. The rear wall 42 of the box prevents the peas from flying out rearwardly, and causes the peas to fall on the conveyers. The arms 34 knock the peas to both sides of the passage 9.

It will be noticed from an inspection of the drawings, that the floors or aprons 18 are spaced apart to form the passage 9, and the front end of the said passage may be varied in width, by means of the portions 11ª of the guide brackets. The aprons 18 are arranged directly below the upper runs of the conveyers, and each of the said aprons extend from near the shafts 12 to a point above the front wall of the receptacle 19. As shown in Fig. 2, the aprons are slotted longitudinally to permit the passage of the teeth 39 of the bars. The said teeth moving through the slots, move also between the slats of the upper run of the conveyer. As soon as the peas and trash are passed over the rear ends of the aprons, the said peas and trash fall onto the screens 44, the peas passing through the meshes thereof, while the trash is carried forwardly by the lower runs of the conveyers and dropped downwardly through the open bottom of the machine.

Two receptacles 19 are provided, in order that there may be no hindrance to the passage of the plants at the rear of the machine. The said receptacles are spaced apart on each side of the passage 9, and the said passage extends from one end of the machine to the other. It will be noticed from an inspection of Fig. 2 that the side walls of the box 3 are extended on each side rearwardly, as indicated at 52, to inclose each side of the machine between the box 3 and the adjacent receptacle 19. The extensions 52 have their upper edges at the level of the shaft 6, and the lower edges thereof are curved upwardly from a point slightly in rear of the axle 4 to a connection with the front of the adjacent box or receptacle 19. The rear wall 42 of the box is extended below the upper edge of the extensions 52. The extensions 52 prevent the peas escaping laterally in rear of the box 3, and each extension is continuous with the outer end of the adjacent box or receptacle 19.

The conveyers pass the material downwardly, and the teeth or fingers 39 keep it stirred up, rubbing and shaking it back and forward, until it falls from the conveyers onto screens, arranged below the conveyers and between the same and the extension 19. By means of the clutch, on the shaft 6, the operating mechanism of the harvester may be released from the wheels at the end of the row, or during transportation of the machine from field to field.

A plurality of plates or fingers 46 are connected with the shaft, each plate or finger having bearings 47 at its upper end for engaging the shaft. The plates or fingers swing freely on the shaft, and when the plants 10 enter the space between the conveyers, the said plates or fingers are lifted and moved rearwardly to permit the passage of the plants. The plates or fingers 46 prevent the peas from being knocked out of the box 3 through the opening 44. The floors or aprons 18 at each side of the machine are spaced apart at their inner edges to leave an opening or slot 48 at the center of the machine, and the said passage 48 may be enlarged or narrowed by means of the strips 49, each of which is secured to the inner edge of the floors or aprons 18, by means of bolts 50. The strips 49 are slotted transversely for receiving the bolts 50, and by loosening the bolts, the strips may be moved toward or from each other to widen or narrow the passage. The depending teeth 39 coöperate with the conveyers for moving the trash and peas rearwardly, and there are no offsets or corners on the floors 18, the said floors extending gradually upward at an inclination so that there is nothing to catch and hold the trash.

I claim:

1. A pea harvester comprising a wheeled frame, a box supported by the frame and provided with a central longitudinal passage in its bottom and an opening in its front for the passage of the plants, an endless conveyer on each side of the passage and extending longitudinally of the same, the rear ends of the conveyers being inclined upwardly, means for supporting and moving the conveyers, a shaft journaled transversely of the opening of the front of the conveyer at the upper end thereof, plates or fingers journaled on the shaft and depending therefrom and normally closing the opening, and means within the box for knocking the peas from the plants.

2. A pea harvester comprising a wheeled frame, a box supported by the frame and provided with a central longitudinal passage in its bottom and an opening in its front for the passage of the plants, an endless conveyer on each side of the passage and extending longitudinally of the same, the rear ends of the conveyers being inclined upwardly, means for supporting and moving the conveyers, a pair of spaced crank shafts journaled transversely of the frame at the rear thereof, links connecting the registering cranks of the shafts, depending teeth on each link, and means for rotating one of said crank shafts, said teeth coöperating with the conveyers to move the peas and trash rearwardly.

3. A pea harvester comprising a wheeled frame, a box supported by the frame and provided with a central longitudinal passage in its bottom and an opening in its front for the passage of the plants, an endless conveyer on each side of the passage and extending longitudinally of the same, the rear ends of the conveyers being inclined upwardly, means for supporting and moving the conveyers, said box having an opening in its front at the passage, depending plates hinged to the box at the top of the opening and normally closing the same, and means in the box for knocking the peas from the plants.

THOMAS B. GRAY.

Witnesses:
T. M. BELLAMY,
F. M. SMITH, Jr.

Copies of this patent may be obtained for five cents each, by addressing the "Commissioner of Patents, Washington, D. C."